March 21, 1950 — A. RAPPL — 2,501,092

WINDOW OPERATOR OF THE ENDLESS CABLE TYPE

Filed May 25, 1945 — 2 Sheets-Sheet 1

INVENTOR
ANTON RAPPL
BY
Bean, Brooks, Buckley & Bean. ATTORNEYS

March 21, 1950      A. RAPPL      2,501,092
WINDOW OPERATOR OF THE ENDLESS CABLE TYPE
Filed May 25, 1945      2 Sheets-Sheet 2
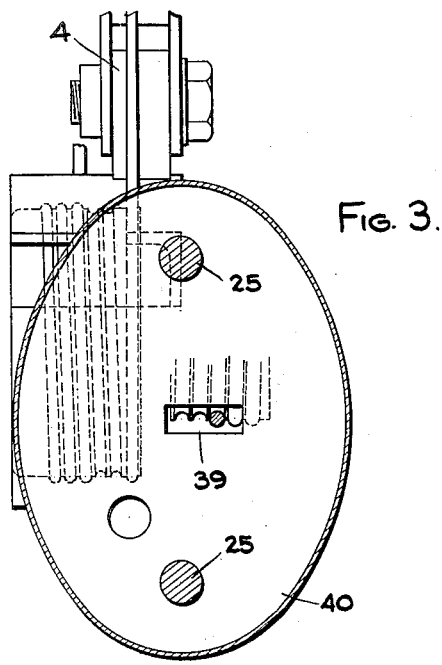
Fig. 3.
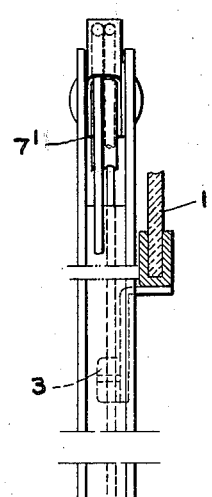
Fig. 4.
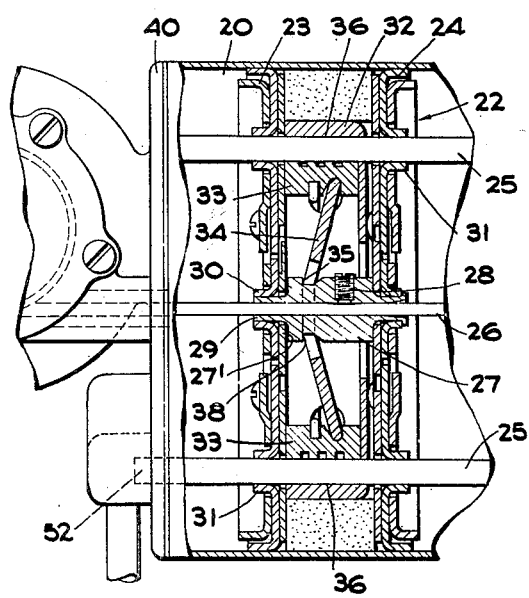
Fig. 5.
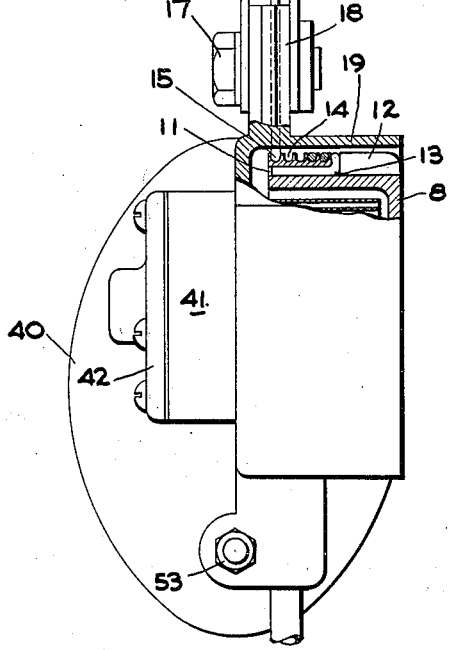
INVENTOR
ANTON RAPPL
BY
Bean, Brooks, Buckley & Bean ATTORNEYS Patented Mar. 21, 1950

2,501,092

UNITED STATES PATENT OFFICE 2,501,092

WINDOW OPERATOR OF THE ENDLESS CABLE TYPE

Anton Rappl, Eggertsville, N. Y., assignor to Trico Products Corporation, Buffalo, N. Y.

Application May 25, 1945, Serial No. 595,740

21 Claims. (Cl. 268—125)

This invention relates to a window operator and primarily to one of the fluid pressure type especially designed for opening and closing the windows of a motor vehicle. In an earlier patent, No. 2,432,799, there is disclosed a window operator having a flexible window-supporting transmission which slidably extends through the opposite ends of the motor chamber and connects with the motor piston for being driven thereby. Such disclosure is practical and efficient and provides a simply constructed mechanism for regulating and adjusting a motor vehicle window quickly with an air cushioned movement.

The primary aim of the present invention is to provide an improved window system of durable construction and one which will perform efficiently and effectively in opening and closing the window.

Another important object of the present invention is to provide a window system of the fluid pressure type which will act toward the conservation of the limited supply of negative pressure or suction available in the internal combustion power plant of a motor vehicle.

A further and equally important object of the invention is to provide a novel window operator which is compact and of small dimensions to thereby facilitate its installation in the confined quarters found therefor within the wall structure of an automobile.

In the drawings:

Fig. 3 is a transverse section about on line III—III of Fig. 2;

Fig. 4 is a side elevation of the embodiment shown in Fig. 1, portions being depicted in section; and Fig. 5 is a fragmentary sectional view of the motor with parts left in elevation.

Figure 1:
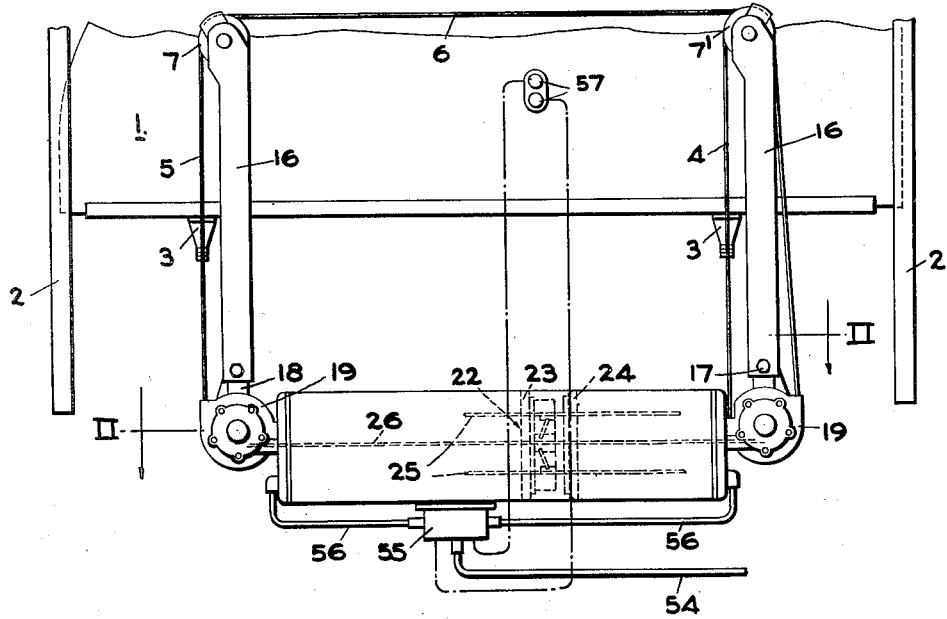
Fig. 1 is a diagrammatic view showing a practical embodiment of the present invention.

Referring more particularly to the drawings, the numeral 1 designates a closure which may be of suitable design and which hereinafter is conveniently referred to as a window, such as a side window of an automobile. The window is slidable within upright channel guides 2 and is supported by brackets 3 on a pair of substantially vertical active flights 4 and 5 forming portions of a flexible member or cable 6. The active flights are supported by wheels 7 and 7' at their upper ends and by other wheels 8 and 8' at their lower ends. Preferably, the ends of the window supporting cable are anchored on the wheels 8 and 8' for winding thereabout and therefore the latter are in the nature of drums formed with spiral cable-receiving grooves 14 in their peripheries. Each drum is fixed on a shaft 9, through a press fit on the knurling 10, and provided with a bore 11 to receive the adjacent cable extremity. As shown in Fig. 4, this bore extends substantially parallel to the axis of rotation and opens into a radial slot 12 which permits the cable being given an outward bend 13 to lead the cable into the spiral groove 14. The drum 8' is provided with a pulley portion having an annular groove 15 separate and distinct from its spiral groove 14, and from this drum, as viewed in Fig. 1, the cable extends upwardly over the pulley wheel 7' and thence downwardly into the pulley groove 15 to form the active flight 4. The cable then retakes about the wheel 7', which latter has two annular grooves for this purpose, and across to the wheel 7 from whence it passes down onto the other drum to form the companion active flight 5.

It is apparent from the foregoing that the window supporting cable will wind about one drum as it pays off the other, and vice versa. It is also obvious that as this cable winds off one drum onto the other, the active flights will move in synchronism to impart translatory movement to the cable supported window 1. The upper wheels 7 and 7' may be supported in a suitable manner although herein they are illustrated as being journaled on the upper ends of arms 16 which have their lower ends connected by pivots 17 to upstanding ears 18 on the drum housings 19. This mounting enables the resulting frame structure to be collapsed by folding the arms 16 down when being inserted through a restricted entranceway during installation.

The power unit of the window operator is herein illustrated in the form of a fluid motor having an elongated chamber 20 and a pressure operable member or piston 22. This piston may be of the self-locking type, as is more fully described in Patent No. 2,369,797 granted February 20, 1945, the same having a pair of sections 23 and 24 slidably supported on the fixed rods 25 within the motor chamber 20. The piston section 24 is fixed to a flexible piston rod or cable 26 by means of a collar 27 which may be shrunk onto the rod 26 or otherwise secured thereto, as by a set screw 28. The collar has a cylindrical extension 29, on which the piston section 23 has limited sliding fit, fluid sealed by means of the packing flange 30. The sliding fit of the piston sections on the rods 25 is sealed by flanges 31.

A housing 32 carried by the movable section 23, and through which the rods 25 extend, encloses a pair of friction shoes 33 which are supported on the outer ends of the toggle arms 34 while their inner ends rockingly engage each other beneath a shoulder 35 on the collar 27. When the piston rod 26 is moved by the window to the right, as viewed in Fig. 5, the toggle will expand the shoes 33 against the fixed rods 25, and the latter against the end walls 36 of the housing 32, thereby causing the walls 36 and the shoes 33 to grip the rods and lock the piston stationary. A reverse movement of the piston rod will release the grip to permit movement of the piston along therewith. When the piston section 23 is fluid actuated a slight clearance between the section and the collar shoulder 27', or the companion section 24, will permit relative movement between the sections to release the lock shoes 33 initially and thereafter to enable the section 23 driving the section 24 ahead.

The piston cable 26 passes through the collar 27 and forms in effect two members extending from the opposite sides of the piston 22. The outer ends of these two members are fastened to and wind respectively upon two smaller drums 37 which are fixed, as by a press fit on the knurled portions 38, to the inner ends of the adjacent shafts 9. The periphery of each drum 37 is provided with a spiral cable receiving groove, and as the cable 26 winds on and off the drum, its lateral displacement is accommodated by a slot 39 in the end wall or head 40 of the motor chamber. Each drum 37 is enclosed within an airtight housing 41 which in effect constitutes a continuation of the motor chamber 20 by reason of the communicating slot 39. A removable cap plate 42, sealed by a gasket 43, gives access to the drum chamber 44 and also provides journal support for the inner end of the shaft 9, as shown at 45. The intermediate portion of the shaft is given anti-friction support by the roller bearing 46 and a sealing ring 47 about the shaft 9 prevents air leakage into the drum chamber 44. This packing ring 47 is supported on a ledge 48 extending inwardly from the drum bearing 41' between the packing ring and the roller bearing 45, a washer 49 serving to support the packing ring from the hub of the drum 37. The drum housings 19 and 41 and the ledge 48, together with the ear 18 and the chamber head 40 may be conveniently die cast as an integral one-piece unit. These integral castings have gaskets 50 seating on the opposite ends of the tubular motor body 51 and the entire assembly is held together by the lock rods 25 which have threaded engagement 52 in one chamber head and in a cooperating nut 53 in the opposite head. By reason of the gaskets 43 and 50 and the packing ring 47 the chamber 20 and its extensions 44 are effectively sealed against air leakage.

Preferably the motor chamber is normally at both sides of the piston under suction as furnished through a supply line 54 from a suitable source, such as the intake manifold of the vehicle engine. This supply line leads to a master control valve 55 from whence the branch conduits 56 opening through the opposite heads 40 maintain normal suction communication with the opposite ends of the motor chamber 20, as is shown more particularly in my prior Patent No. 2,439,863. Control buttons 57 are selectively operable to actuate the master control 55 for venting one side or the other of the motor chamber, thereby unbalancing the normally suction balanced piston 22 and accordingly causing the piston cable 26 to wind upon one of the two drums 37 and unwind from the other. Each drum 37, being fixed upon a common shaft with a companion drum 8 or 8', will actuate the flexible window supporting cable 6 and effect corresponding adjustment of the window. A window counterbalancing spring 58 may be enclosed within the drum 8 and have one end fixed thereto and the opposite end anchored to the bearing 41'.

The window supporting cable 6 and the piston cable 26 may be, and in effect do constitute, an endless power transmitting unit supported by the four wheels 7, 7', 8 and 8' (37). This unit slidably supports the movable piston 22 for limited movement and transmits a window-imparted opening movement to actuate the lock 33, 34. Included in this flexible transmission unit is a motion amplifying means in the form of a differential pulley or wheel as provided by the drums 37 and the relatively larger drums 8 and 8'. The motion amplifying means has the effect of accelerating the movement of the window with respect to that of the piston. This tends toward compactness of structure since the motor chamber may be reduced in length to facilitate the installation of the mechanism in an automobile. The drums 8, 8' and 37 constitute enlarged heads on the shafts and form integral parts thereof. Furthermore, the active flights 4 and 5 may be displaced laterally from the center of the motor to dispose them closer to the plane of the window panel and its movement. An automobile body having a side bulge, wherein the lower or well portion of the door curves inwardly in a downward direction, will enable placement of the fluid motor to the inner side of the plane of window movement. Another important advantage of this construction permits the motive power to be transmitted from the motor chamber to the exterior by means of the rotating shafts 9 instead of a sliding part. Consequently, the motor may be more readily sealed by the packing rings 4 for greater efficiency. Should it be desired, the motion amplifying differential pulley wheel or drum construction could be placed beyond the ends of the piston chamber and the flexible piston rod 26 fluid sealed where it slides through the chamber heads. By reducing the diameter of the drums 8, 8' to less than that of the drums 37 a motion reducing action will follow by which a larger motor may be used.

Figure 2:
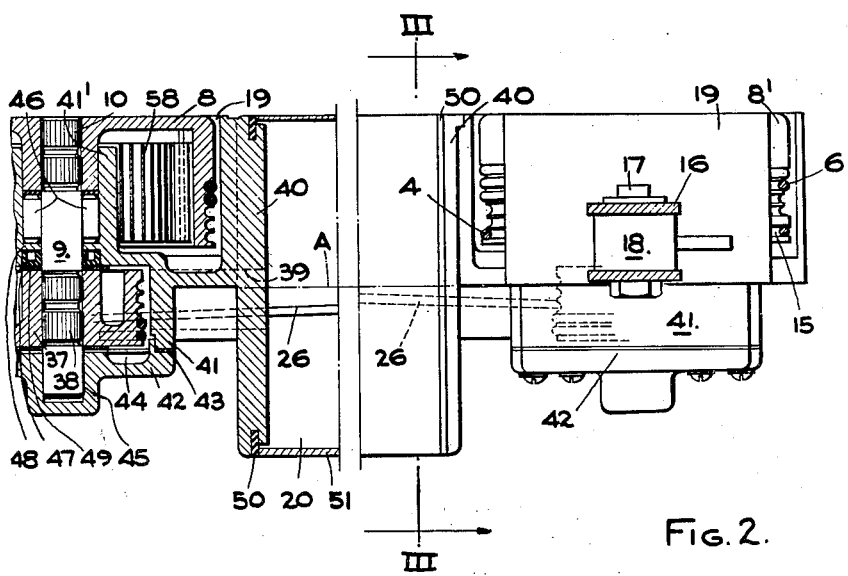
Fig. 2 is a fragmentary horizontal section therethrough about on line II—II of Fig. 1.

As stated above, the slot 39 accommodates the lateral displacement of the piston cable 26 as it winds onto and unwinds from the drums 37. The parts are so arranged that when the piston is in either extreme position within the motor chamber 20 the shorter section of the piston cable extends axially from the piston to the closer one of the drums 37, while the longer section unwound from the more remote drum 37 will extend at an angle by reason of its unwinding position from the spiral groove. In other words, when the piston cable is wound to its fullest extent upon one drum 37, the relatively shorter section of the cable suspended between such drum and the piston will extend along the axis of the motor chamber, indicated by the broken line A in Fig. 2, so that when the piston begins its return movement, the force exerted will be in an axial direction. Then as the piston continues its movement, the cable 26 will become laterally displaced as it unwinds from the drum, but as the lateral displacement increases the suspended length of the cable also increases with the result that there is no sharp angularly directed force acting on the piston which might tend to disrupt its travel.

The window operator is efficient in operation and practical in design and construction. The low pressure or suction supply is conserved effectively against leakage. Any effort to pry the window open will be transmitted through the motion amplifying means in a manner to cause the endless unit 6, 8, 9, 37 and 26 to expand the lock shoes 33 outwardly and set them firmly against the fixed rods 25. This flexible unit is of fixed lineal extent and acts in tension to regulate and lock the window. The tension of the flexible cable may be controlled by adjusting the arms 16 and thereafter tightening the pivots 17. If desired, the terminals of the window supporting cable 6 could be joined into an endless loop in lieu of anchoring them individually on their respective drums.

It will be understood that the apparatus and system described and shown herein is merely illustrative of the inventive principles involved which latter may be applied in other physical embodiments without departing from the scope and spirit of the invention claimed.

What is claimed is:

1. A window operator comprising a flexible transmission member supported to provide an active window supporting flight, a window supported by the latter, a fluid motor having a chamber with a pressure operable member movable back and forth therein, a shaft journaled in each end of the motor chamber with one end of the shaft projecting to the outside of the chamber, the opposite ends of the transmission member being operatively connected to the projecting ends of the shafts for winding alternately thereon, and means operatively connecting the pressure operable member to the inner ends of the shafts whereby the pressure member will pull the active flight in one direction or in the other to open or close its supported window.

2. A window operator comprising a flexible transmission member supported to provide an active window supporting flight, a window supported by the latter, a fluid motor having a chamber with a pressure operable member movable back and forth therein, a shaft journaled in each end of the motor chamber with one end of the shaft projecting to the outside of the chamber, the opposite ends of the transmission member being operatively connected to the projecting ends of the shafts for winding alternately thereon, and means operatively connecting the pressure operable member to the inner ends of the shafts, the projecting ends of the shafts being of a different diameter than the inner ends thereof whereby to vary the speed of movement of the transmission member with respect to the movement of the pressure operable member of the motor.

3. A window operator comprising a flexible transmission member supported to provide an active window supporting flight, a window supported by the latter, a fluid motor having a chamber with a pressure operable member movable back and forth therein, a shaft journaled in each end of the motor chamber with one end of the shaft projecting to the outside of the chamber, the opposite ends of the transmission member being operatively connected to the projecting ends of the shafts for winding alternately thereon, means sealing the motor chamber about the shafts against air leakage, and means operatively connecting the pressure operable member to the inner ends of the shafts.

4. A window operator comprising a flexible transmission member supported to provide an active window supporting flight, a window supported by the latter, a fluid motor having a chamber with a pressure operable member movable back and forth therein, a shaft journaled in each end of the motor chamber with one end of the shaft projecting to the outside of the chamber, drums fixed on the projecting ends of the shafts, the opposite ends of the transmission member winding respectively on the two drums, relatively smaller drums fixed on the inner ends of the shafts, flexible members winding respectively on the smaller drums and operatively connected to the pressure operable member, whereby the movement of the flight supported window will be accelerated over that of the pressure operable member.

5. A window operator comprising a flexible transmission member supported to provide an active window supporting flight, a window supported by the latter, a fluid motor having a chamber with a pressure operable member movable back and forth therein, a shaft journaled in each end of the motor chamber with one end of the shaft projecting to the outside of the chamber, flexible members connected at their inner ends to the opposite sides of the pressure operable member and having their outer ends connected respectively to the inner ends of the shafts for winding onto and unwinding off from the same, and a drum operatively connected to the outer end of each shaft, the opposite ends of the flexible transmission member winding about the respective drums.

6. A window system having a window, a fluid motor for operating the same having a pressure chamber and a pressure operable member therein, a shaft journaled in the motor and extending through an air tight seal to the outside, a flexible transmission member, wheels operatively supporting the latter to define an active flight, means operatively connecting the active flight to the window, one of said wheels being operatively connected to the outer end of the shaft, and means operatively connecting the inner end of the shaft to the pressure operable member.

7. A window system having a window, a fluid motor for operating the same having a chamber and a pressure operable member movable back and forth therein, a shaft journaled in each end of the chamber with an air tight seal, each shaft having one end protruding to the exterior, a window actuating power transmission connected to the outer ends of the shafts for being actuated thereby to effect adjustment of the window, and a flexible connector extending from opposite sides of the pressure operable member to and winding about the respective shafts for rotating the same.

8. A window system comprising a window, a fluid motor for operating the same having a chamber and a piston therein, a flexible transmission operatively connecting the piston to the window for back and forth movement and including opposed sections alternately pulled by the piston one in one direction and the other in the opposite direction with motion amplifying means incorporated in each section whereby to accelerate the window movement with respect to the piston movement.

9. A window system comprising a window, a fluid motor for operating the same having a chamber and a piston therein, a flexible transmission having opposed sections entering the chamber through its opposite ends and operatively connecting the piston to the window for back and forth movement therewith with limited lost motion, motion amplifying means included in the flexible transmission and acting to accelerate the window movement with respect to the piston movement, and a friction lock engageable with a fixed part of the motor and operable by a window imparted movement of the flexible transmission during such lost motion to frictionally lock the window against movement, said motion amplifying means serving to increase the force of such window imparted effort as applied to the lock whereby to more firmly bind the window against movement.

10. A window system comprising a window, a fluid motor for operating the same having a chamber and a piston therein, a flexible transmission having opposed sections entering the chamber through its opposite ends and operatively connecting the piston to the window for back and forth movement with a limited lost motion in the piston connection, a motion amplifying unit in each section of the flexible transmission for accelerating the window movement with respect to the piston movement, and a friction lock operating to engage a fixed part of the motor by and during the relative movement between the piston and the transmission as permitted by the lost motion when the transmission is moved by a window imparted effort as transmitted through the corresponding one of the motion amplifying units.

11. A window system comprising a window, a fluid motor for operating the same having a chamber and a piston therein, a flexible transmission operatively connecting the piston to the window for back and forth movement and including opposed sections alternately pulled by the piston one in one direction and the other in the opposite direction with motion amplifying means incorporated in each section of the transmission whereby to accelerate the window movement with respect to the piston movement, said transmission being slidable through the piston and supported in tension by a pair of wheels at the opposite ends of the chamber, means limiting the relative sliding movement between the piston and the transmission, and a window lock operable by a window imparted effort on the transmission as transmitted through the motion amplifying means during such relative sliding movement.

12. A window system comprising a window, a fluid motor for operating the same having a chamber and a piston therein, a flexible transmission operatively connecting the piston to the window for back and forth movement and including opposed sections alternately pulled by the piston one in one direction and the other in the opposite direction with motion amplifying means incorporated in each section whereby to accelerate the window movement with respect to the piston movement, said flexible transmission embodying a power transmitting member slidably extending through the piston for limited play movement with respect thereto, and a window lock carried by the piston and engageable with a fixed part during such play movement and by a window imparted force transmitted through the motion amplifying means and the power transmitting member to lock the window against movement, said piston being fluid responsive and slidable upon the power transmitting member initially by reason of the limited play movement to render the lock inoperative and thereafter to move the flexible transmission for actuating the window.

13. A motor vehicle having a closure, a flexible member connected to the closure and supported at spaced points to define a closure supporting flight intermediate its ends, a fluid motor having a chamber and a piston, a shaft journaled adjacent each end of the motor, the opposite ends of the flexible member being connected to the two shafts respectively, a flexible power transmitting member extending in opposite directions from the piston and taking about the respective shafts in such manner that a pull of the piston on the power transmitting member in one direction will turn one shaft to wind the closure supporting member thereabout and turn the other shaft to unwind the flexible member therefrom, and means for controlling the operation of the motor.

14. A motor vehicle having a closure, a flexible member having an active portion supported between spaced pulley means, means connecting the closure to the active portion for being opened and closed thereby, a fluid motor comprising a chamber and a piston, the piston having two relatively movable sections, a second flexible member having a portion connected to and extending in opposite directions from one of the piston sections, motion changing means interposed between the two flexible members whereby a piston imparted movement of the second flexible member will be changed accordingly in the closure connected active portion and whereby the closure imparted effort impressed on the active portion will be reversely changed as applied to said one piston section, and locking means carried by the other of said piston sections and having a part connected to the second flexible member to be actuated thereby to lock the piston against movement with a degree of securement varying according to the pull exerted, an opposite pull on the second flexible member serving to pull said one piston section to hold the locking means inoperative and thereafter move as a unit to actuate the closure.

15. A vertically slidable window, guide means therefor, upper pulley means, a fluid motor unit beneath the pulley means and including a chamber and a piston in the chamber with shaft means journaled on each end of the chamber, a flexible transmission member of fixed length supported in tension by the pulley means and said shaft means to provide spaced vertical active portions, spaced attachment means on the window positioning the latter on the active portions for translatory motion when raised and lowered thereby, means operatively connecting the shaft means to the piston for being rotated thereby, and means carried by the motor and adjustably supporting said pulley means to take up slack in the flexible member and thereby serving to tension the latter for preserving such translatory motion.

16. A window, guide means slidably supporting the window, a flexible power transmission comprising a plurality of wheels journaled to provide four fixed points of support, a flexible member having a fixed lineal dimension and mounted in tension on the wheels to provide a window actuating member, such fixed points of support defining a pair of substantially parallel active portions intertied by a cross portion, means bodily supporting a window at spaced points on the two active portions for translatory motion, a fluid motor having a pressure operable member movable back and forth, and speed changing means on opposite sides of the pressure operable member and connecting the latter to the active portions whereby the motor imparted window movement will be changed accordingly.

17. A window, a fluid motor for operating the same having a chamber and a piston therein, a flexible transmission member having an upright active portion supporting the window for up and down movement, and lost motion means connecting the fluid motor to the flexible transmission member to pull the latter first in one direction and then the other for imparting up and down movement to the latter and including a motion amplifying means on each side of the connecting means acting to accelerate the window movement with respect to the motor, and a window lock having a movable actuator connected to the transmission member and operable by a window imparted movement of the transmission member during such lost motion to lock the motor against movement, said flexible transmission member supporting the window in a manner to have the weight of the latter transmitted through the motion amplifying means normally for tending to hold the lock operative.

18. A window, guide means slidably supporting the same, two pairs of upper and lower wheels arranged to provide four relatively fixed points of support, flexible transmission means extending about the four points of support in succession and retaking about the third and fourth points to define substantially parallel active parts at the corresponding sides of said pairs for movement in unison, means supporting the window on said active parts for translatory movement on the guide means, a drive operable back and forth, and speed changing means on opposite sides of the drive and operatively connecting the latter to said active parts for changing speed of operation of the latter accordingly.

19. A window operator comprising a window, an actuating flexible member therefor with means operatively supporting the same including a pair of wheels, a fluid motor having a chamber interposed between the wheels, a piston movable back and forth in the chamber, a shaft journaled in each end of the chamber with one end of the shaft extending into the interior of the chamber and the opposite end projecting to the outside of the chamber and operatively connected to the adjacent one of said wheels, means operatively connecting the piston to the inner ends of the shafts to rotate the same when the piston is operated, and means fluid sealing the shafts against air leakage.

20. A window operator comprising a window, an actuating member therefor, a fluid motor having a chamber and a piston therein, a shaft journaled in each end of the chamber and operatively connected to the actuating member, and a flexible power transmitting member extending from opposite sides of the piston and secured to the two shafts at points off center from the longitudinal axis of the chamber and constrained to wind alternately onto the shafts in such manner that as the winding progresses the pulling portion of the flexible member will shift laterally toward such axis of the motor chamber.

21. A window operator for mounting as a unit in a window well of a motor vehicle, comprising a fluid motor having a chamber and a piston therein, a pair of arms mounted on the opposite ends of the chamber and extending upwardly therefrom to form with the motor a substantially U-shaped frame, wheels journaled on the upper ends of the arms, a flexible transmission member supported by said wheels at the upper ends of the arms and by other wheels at the lower ends of the arms to provide a pair of parallel active flights, means for supporting a window panel on said active flights in a balanced state whereby the arms acting through the parallel active flights serve under longitudinal compression to support the weight of the window panel, and means for controlling the operation of the motor.

ANTON RAPPL.

REFERENCES CITED

The following references are of record in the file of this patent:

UNITED STATES PATENTS

| Number | Name | Date |
| --- | --- | --- |
| 1,198,138 | Lovell | Sept. 12, 1916 |
| 1,524,906 | Bosserdet | Feb. 3, 1925 |
| 1,529,798 | Knapp et al. | Mar. 17, 1925 |
| 1,638,897 | Vaughan | Aug. 16, 1927 |
| 2,314,429 | Simpson | Mar. 23, 1943 |
| 2,338,069 | Horton et al. | Dec. 28, 1943 |
| 2,341,478 | Rappl | Feb. 8, 1944 |
| 2,369,797 | Rappl | Feb. 20, 1945 |
| 2,370,740 | Lundell | Mar. 6, 1945 |
| 2,415,565 | Rappl | Feb. 11, 1947 |

FOREIGN PATENTS

| Number | Country | Date |
| --- | --- | --- |
| 18,134 | Great Britain | A. D. 1907 |